Oct. 20, 1931.  G. E. BARRETT  1,828,638
VEHICLE PROPULSION AND STEERING MECHANISM
Original Filed Jan. 26, 1928   2 Sheets-Sheet 1

Inventor
George E. Barrett
By Clarence A. O'Brien
Attorney

Oct. 20, 1931.   G. E. BARRETT   1,828,638
VEHICLE PROPULSION AND STEERING MECHANISM
Original Filed Jan. 26, 1928   2 Sheets-Sheet 2

Inventor

George E. Barrett

By Clarence A. O'Brien
Attorney

Patented Oct. 20, 1931

1,828,638

UNITED STATES PATENT OFFICE

GEORGE E. BARRETT, OF FORT WAYNE, INDIANA

VEHICLE PROPULSION AND STEERING MECHANISM

Application filed January 26, 1928, Serial No. 249,647. Renewed July 15, 1931.

This invention relates to new and useful improvements in propelling and steering means for motor vehicles and has for its primary object to provide propelling and steering mechanism for dispensing with the well known differential that is now employed in practically all types of motor vehicles.

Generally the invention resides in the provision of a pair of transversely arranged motors at the rear end of the machine frame, which motors are mounted for swinging movement with respect to the frame, and in opposite directions, the rear power wheels being preferably connected direct to the power shaft of the motors. Furthermore, the forward axle of the machine is pivoted at its center to the frame of the machine and is connected adjacent opposite ends by tie rods to the inner ends of the motors at the rear of the frame so that when the forward axle is swung upon its pivot to cause the steering of the machine, the said motors will be swung in reverse directions for moving the rear traction wheels obliquely at an opposite direction to the oblique angle of the wheels of the forward axle. Obviously, this will result in the short turning of the machine when the same is traveling either forwardly or reversely.

In the drawings wherein there is disclosed the most preferred embodiment of the present invention:

Figure 1:
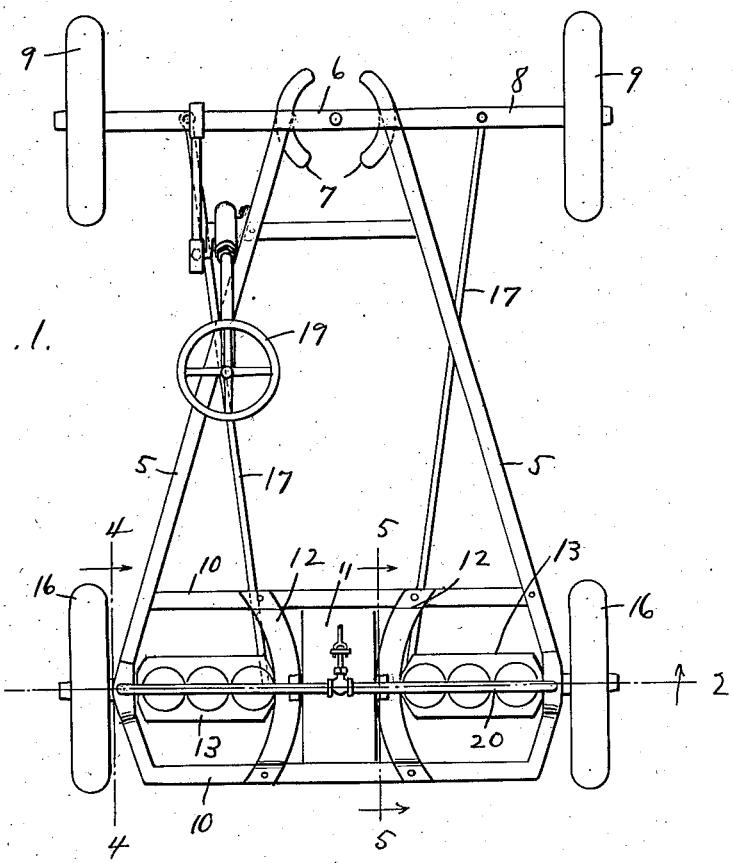
Figure 1 is a top plan view of a vehicle chassis constructed in accordance with the present invention, the position of the parts being as disclosed when the vehicle is moving in a straight line.
Figure 3:
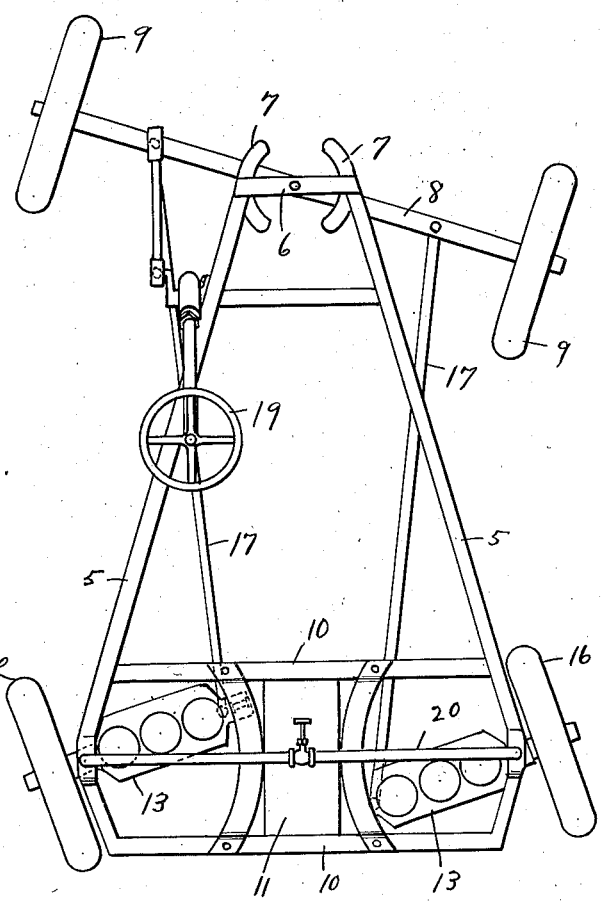
Figure 4:
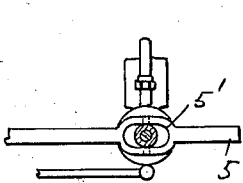
Figure 5:
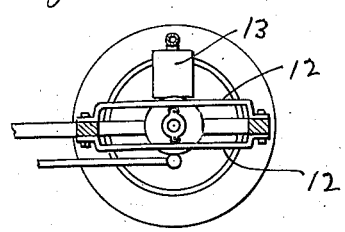

Figure 3 is a top plan view of the chassis, this view illustrating the position of the various structural elements when the machine is moving other than in a straight path, and Figures 4 and 5 are detail longitudinal sections taken substantially upon the lines 4—4 and 5—5 of Figure 1, looking in the direction of the arrows.

Now having particular reference to the drawings, there is disclosed a vehicle chassis including a pair of longitudinal frame bars 5—5 that converge inwardly toward the forward ends thereof, said forward ends of the frame bars being connected by a short cross piece 6. Furthermore, at the forward ends of these bars 5—5 the same are equipped with opposed segmental arms 7—7. Pivoted intermediate its ends to the connecting member 6 between the side bars 5—5 is a transverse front axle 8, while arranged upon the ends of the axle are the usual tired wheels 9—9.

Interconnecting the side frame bars 5—5 at the rear ends thereof is a pair of spaced parallel frame bars 10—10 arranged between the centers of which is a fuel tank 11. Extending longitudinally between these parallel bars 10—10 at opposite sides of the fuel tank 11 are inwardly curved pairs of runner or track bars, those of each pair being designated 12—12. Intermediate the transverse spaced parallel bars 10—10 between the frame bars 5—5 said runner or track bars are in spaced parallel relation as disclosed in the sectional view of Figure 5.

Intermediate the transverse spaced parallel frame bars 10—10 the side frame bars 5—5 are formed with two longitudinally extending and parallel elongated openings 5'—5' of somewhat elongated formation as disclosed in Figure 4.

Arranged between said side frame bars 5—5 and the pairs of rail or track bars 12—12 are motors 13—13 arranged so that the power shafts thereof will extend transversely to the longitudinal axis of the machine as disclosed. If the size of the machine is such as to function more properly with a six cylinder power plant, each of the motors 13 is of the three cylinder variety and will combine to produce the desired power.

Figure 2:
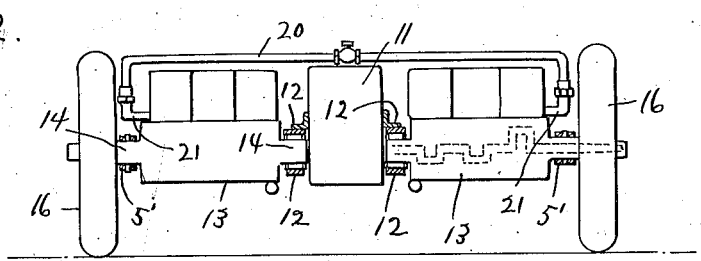
Figure 2 is a detail transverse section through the rear end of the machine taken substantially upon the line 2—2 of Figure 1.

The crank case of each motor 13 is formed at its opposite ends with bearing projections 14—14 within which the ends of the respective crank shaft are journaled as suggested by the dotted lines at the right hand end of Figure 2. The outer end of each crank shaft extends beyond the outermost collar, and has keyed thereto a suitable traction wheel 16. These outermost bearing projections 14 of said motors are pivoted within the eyes 5' of the frame bars 5—5 as also more clearly disclosed in Figure 4. The innermost projections 14 are equipped with suitable rollers or bearings for engagement with the rail or track bars 12—12 so as to provide an antifriction support between the inner ends of the motors and said pairs of rails or track bars.

Interconnecting the inner ends of the motors 13—13 and the front pivotal axle 8 adjacent its outer end are tie rods 17—17, pivotally connected at their opposite ends to the motors and to the axle so as to permit of the proper swinging of the said axle and the rear motors as disclosed in Figure 3.

The front axle 8 is associated with a suitable manually operable steering mechanism 19 and it will be obvious that when the axle is swung to the position disclosed in Figure 3 the motors 13—13 will swing within their support in opposite directions with respect to each other and opposite to the swinging movement of the axle 8 so as to cause the movement of the rear traction wheels at an oblique angle opposite to the oblique angle of the front wheels 9—9 resulting in the short turning of the machine.

Furthermore, it will be seen that this character of propulsion and steering mechanism for vehicles will overcome the requirement of the now necessary differential mechanism.

Any suitable means may be provided for conveying the fuel from the tank 11 to the motors 13—13 by means preferably consisting of a cross pipe 20 having communication with the tank intermediate its ends and being connected at its opposite ends to the motors through the medium of swivelled connection 21—21.

It is of course to be understood that suitable bearings are to be provided between the front axle 8 and the frame of the machine and that suitable bearings are to be provided at other points where required, the drawings illustrating in a broad manner the general principles of construction and operation of the present invention.

Having thus described the invention, what I claim as new is:—

1. In a vehicle comprising front and rear pairs of wheels, a common axle shaft for the front pair of wheels, a stub shaft for each of the rear pair of wheels, the rear wheels being positioned on the outer ends of the said stub shafts, pivotal connections between the outer end portions of the stub shafts and the vehicle, a connecting rod interposed between the inner end of each stub shaft and the adjacent end portion of the front shaft, a crank, a connecting rod between the crank and the front shaft, and manual means for actuating the crank.

2. In a vehicle comprising front and rear pairs of wheels, a common axle shaft for the front pair of wheels, a stub shaft for each of the rear pair of wheels, the rear wheels being positioned on the outer ends of the said stub shafts, pivotal connections between the outer end portions of the stub shafts and the vehicle, a connecting rod interposed between the inner end of each stub shaft and the adjacent end portion of the front shaft, and manual means for swinging the front shaft.

In testimony whereof I affix my signature.
GEORGE E. BARRETT.